3,329,623
Patented July 4, 1967

3,329,623
URANIUM DIOXIDE-YTTRIUM OXIDE-ZIRCONIUM DIOXIDE AQUASOL PROCESS AND PRODUCT
Frederick T. Fitch and Jean G. Smith, Baltimore, Md., assignors to W. R. Grace & Co., New York, N.Y., a corporation of Connecticut
No Drawing. Filed Mar. 22, 1965, Ser. No. 442,236
6 Claims. (Cl. 252—301.1)

This invention relates to uranium dioxide-yttrium oxide-zirconium dioxide aquasols and to methods for their preparation.

In summary, the composition of this invention is an aquasol containing intimately associated uranium dioxide-yttrium oxide-zirconium dioxide particles, the uranium dioxide concentration being within the range of from 30 to 99 percent of the total oxide, the yttrium oxide concentration being within the range of from 1 to 99 percent base on the weight of the yttrium oxide and zirconium dioxide, and the aquasol pH being within the range of from 6.9 to 7.2.

In summary, a process of this invention for preparing a stable uranium dioxide-yttrium oxide-zirconium dioxide aquasol comprises the steps of preparing a mixture of a reactive uranium dioxide-zirconium dioxide aquasol and a reactive yttrium oxide aquasol having a total oxide concentration in the final mixture within the range of from 1 to 100 g./l., a uranium dioxide concentration within the range of from 30 to 99 percent of the total oxide, and an yttrium oxide concentration within the range of from 1 to 99 percent based on the weight of the yttrium oxide and zirconium dioxide; autoclaving the mixture at a temperature of from 120 to 200° C. for from 1 to 16 hours; and recovering the product aquasol containing particles of uranium dioxide-yttrium oxide-zirconium dioxide in intimate mixture.

In summary, an alternative process of this invention for preparing uranium dioxide-yttrium oxide-zirconium dioxide aquasols comprises the steps of preparing an aqueous solution containing uranous salts, yttrium salts, and zirconyl salts, the proportions of said salts being such that the oxide precipitate thereof has a uranium dioxide concentration within the range of from 30 to 99 percent of the total oxide and an yttrium oxide concentration within the range of from 1 to 99 percent based on the weight of the yttrium oxide and zirconium dioxide; mixing the aqueous solution with a quantity of an aqueous ammonia solution sufficient to coprecipitate uranium dioxide-yttrium oxide-zirconium dioxide from said solution; separatng the coprecipitate from the reaction mixture and washing it with water until substantially free from soluble salts; mixing the washed coprecipitate with water and a quantity of a strong cation exchange resin in the hydrogen form to adjust the mixture pH to from 6.9 to 7.2 and thereby peptize the coprecipitate; and separating the aquasol product containing particles of uranium dioxide-yttrium oxide-zirconium dioxide in intimate mixture from the exchange resin.

It is an object of this invention to provide uranium dioxide-yttrium oxide-zirconium dioxide aquasols which can be employed in the manufacture of superior nuclear fuel elements.

It is another object of this invention to provide processes for making uranium dioxide-yttrium oxide-zirconium dioxide aquasols which have application for the manufacture of nuclear fuel elements.

All concentrations are herein stated in terms of weight percent unless otherwise provided.

The uranium dioxide-yttrium oxide-zirconium dioxide aquasol of this invention has a unique utility for use in the manufacture of nuclear reactor fuel elements. The incorporation of the uranium dioxide-yttrium oxide-zirconium dioxide composite into reactor fuel elements stabilizes the uranium dioxide against oxidation and thereby retards disruption of the crystal structure and subsequent loss of fission products. It also prevents high nuclear fuel volatility. Yttrium oxide and zirconium dioxide both have low neutron cross-sections and hence can be tolerated in the fuel elements. The use of the sol facilitates blending of the uranium dioxide-yttrium oxide-zirconium dioxide intimate mixture into the fuel element matric material, usually beryllia powder, as it is easier to uniformly mix a powder with a liquid than with another powder. Furthermore, the sol particles are several orders of magnitude small than those of the conventional ceramic powders. This size factor permits the achievement of a superior dispersion of the sol particles in the matrix and a resulting improved microstructure and grain size control in the final product. The sol particles are also very reactive and can be sintered to form a unitary body at lower temperatures than conventional ceramic powders, and the fuel elements manufactured with the sol of this invention have excellent mechanical strength.

The preferred process of this invention comprises the general steps of mixing a uranium dioxide-zirconium dioxide aquasol and an yttrium oxide aquasol and autoclaving the mixture to form a product aquasol containing particles of uranium dioxide-yttrium oxide-zirconium dioxide in intimate mixture.

The component uranium dioxide-zirconium dioxide sol can be prepared by any convenient technique. A method which has been found to be particularly advantageous employs electrodialysis of a mixed uranyl chloride-zirconyl chloride solution and is disclosed in application Ser. No. 242,354, filed Dec. 5, 1962. The electrodialysis effects both reduction of the hexavalent uranium to the tetravalent state and removal of chloride ions, and thereby effects conversion of the mixed solution to a sol. The equipment suitable for this dialysis has been previously disclosed in application Ser. 693,511, filed Oct. 31, 1957 and consists essentially of an electrodialysis cell with an anion permeable membrane and electrodes, a reservoir for retaining a portion of the solution being treated at an elevated temperature, a cooling device for cooling the solution prior to its entrance into the electrodialysis cell, and suitable conduit means for transferring the solution being treated from the reservoir through the cooling means to the electrodialysis cell and from the electrodialysis cell back to the reservoir. The uranyl chloride-zirconyl chloride solution is maintained at a temperature of about 80° C. in the reservoir and is cooled to about 35° C. before it is passed through the cathode compartment of the electrodialyzer. This process is carried out in a nitrogen or other inert or reducing atmosphere in order to prevent reoxidation of the uranous ion.

The uranium dioxide-zirconium dioxide sols produced by the above-described, preferred process contain particles of uranium dioxide-zirconium dioxide having a size range of from 3 to 15 millimicrons and a concentration up to about 20 percent solids. Obviously other uranium dioxide-zirconium dioxide aquasols can be employed in the process of this invention.

The yttrium oxide sol employed in the preferred process of this invention can be prepared by any convenient technique. A suitable technique which has been found for preparing yttrium oxide aquasols comprises peptizing a washed yttrium oxide precipitate by treating the precipitate with acetic acid and heating. The yttrium oxide precipitate is prepared by precipitating a soluble yttrium salt, preferably the chloride, with an excess of an aqueous ammonia solution. The yttrium hydroxide precipitate is then separated from the reaction mixture, for example by filtration, and washed until free from soluble salts.

The precipitate can be first washed with a 6 N ammonium hydroxide solution and then with water. The washed yttrium hydroxide is then mixed with water and a quantity of acetic acid to provide a pH of about 7. The acid treated precipitate can then be peptized by heating at about 60° C. for about 2 hours. The product yttrium oxide sol is an opaque white sol which settles slowly upon standing, but which is easily dispersed by agitation. This sol must be redispersed prior to use in the preferred process of this invention.

The first step in the preferred process of this invention comprises forming a mixture of a uranium dioxide-zirconium dioxide aquasol and a yttrium oxide aquasol of the type above-described. The aquasols are mixed in the desired proportions and, if necessary, diluted with deionized water to form a final concentration of from about 1 to 70 g./l. and preferably from about 40 to 60 g./l. of total oxides in the sol mixture. The two aquasols are mixed in proportions which are suitable to provide a uranium dioxide concentration within the range of from 30 to 99 percent and preferably from 40 to 50 percent of the total oxide. The yttrium oxide to zirconium dioxide ratio in the mixed sol is such that the yttrium oxide concentration can be from 1 to 99 percent and preferably from 55 to 75 percent based on the weight of the yttrium oxide and zirconium dioxide. The particular ratio of uranium dioxide to zirconium dioxide in the initial respective aquasol can be regulated to provide the desired proportions of uranium dioxide to zirconium dioxide in the final sol mixture.

In order to insure a minimum viscosity of the product sol, the specific conductance of the sol mixture should be from $2.5 \times 10^{-2}$ to $3.5 \times 10^{-2}$ mho/cm. The corresponding pH is within the range of from 6.9 to 7.2.

The next step in the process of this invention comprises autoclaving the sol mixture at a temperature within the range of from 120 to 200° C. and preferably within the range of from 140 to 170° C. for 1 to 16 hours and preferably for from 6 to 10 hours. Either an inert or reducing atmosphere such as an atmosphere of nitrogen gas is maintained in the autoclave during heating to prevent oxidation of the tetravalent uranium. The autoclaving effects a release of anions from the particles as their density increases, causing a slight rise in specific conductance and drop in pH during the treatment. The sol mixture should be agitated during autoclaving.

The product uranium dioxide-yttrium oxide-zirconium dioxide aquasol formed by the preferred process of this invention is black or blue-black and exhibits a viscosity very close to that of water. The dispersed phase does not settle out on prolonged standing. The sol can have a specific conductance within the range of from $3.0 \times 10^{-2}$ to $4.0 \times 10^{-2}$ mho/cm. and a corresponding pH within the range of from about 6.9 to 7.2. The sol concentration can be increased to above 15 percent total oxide by vacuum evaporation at a temperature below about 40° C. with a minimal increase in viscosity. Electron micrographs show that the sol consists primarily of about 3 millimicron sub-units which tend in some instances to form chains or aggregates or both. The aggregates, where formed, are loosely packed, generally, spherical in shape, and generally range up to 30 millimicrons in diameter. The proportions of uranium dioxide-yttrium oxide, and zirconium dioxide in the final intimate mixture or solid solution correspond to the proportions of these compounds provided in the initial sol mixture.

The alternative process of this invention for preparing uranium dioxide-yttrium oxide-zirconium dioxide aquasols comprises, in general, peptization of a washed coprecipitate of uranium dioxide-yttrium oxide-zirconium dioxide by means of pH adjustment of a slurry of the coprecipitate with a strong cation exchange resin in the hydrogen form.

The uranium dioxide-yttrium oxide-zirconium dioxide coprecipitate is prepared from a solution containing uranous salts, yttrium salts, and zirconyl salts. Suitable salts include the chlorides, bromides, nitrates, acetates, sulphates, and other soluble salts of these metals. The salts are employed in the solution in such proportions that the uranium dioxide concentation in the coprecipitate is within the range of from 30 to 99 percent and preferably from 40 to 50 percent of the total oxides, and the yttrium oxide concentration is within the range of from 1 to 99 and preferably from 55 to 75 percent based on the weight of the yttrium oxide and zirconium dioxide in the coprecipitate.

The coprecipitate is formed by mixing the mixed salt solution with a quantity of an aqueous ammonia solution sufficient to coprecipitate uranium dioxide-yttrium oxide-zirconium dioxide from the solution. An excess of ammonia solution is preferred.

The coprecipitate is then separated from the reaction mixture and washed free from soluble salts. The washing procedure can include an initial wash with a 6 N ammonia solution followed by a wash with water.

The next step in the alternative process of this invention comprises mixing the washed coprecipitate with water and reslurrying with a quantity of a strong cation exchange resin in the hydrogen form sufficient to adjust slurry pH to from 6.9 to 7.2. Any strong cation exchange resin is suitable such as Amberlite IR–120 exchange resin. The solids content in the coprecipitate prior to treatment with the cation exchange resin should be within the range of from 1 to 100 grams of total oxide per liter and preferably about 50 grams per liter. This pH adjustment effects peptization of the coprecipitate. The sol product is then separated from the ion exchange resin.

The uranium dioxide-yttrium oxide-zirconium dioxide aquasol formed by the alternative process of this invention contains particles which are irregular in shape and which have a particle size up to about one micron. The sol tends to settle upon standing but can be easily redispersed by mild agitation. The sol is blue-black and has a specific conductance within the range of from $1 \times 10^{-2}$ to $1 \times 10^{-3}$ mho/cm. The sol can be concentrated to at least 15 percent solids by vacuum evaporation.

The sol characteristics are determined by conventional, well known techniques. The sol particles are examined by electron microscopy to determine their characteristics. The electrolyte content of the sols was measured by specific conductance with an Industrial Instruments Conductivity Bridge Model RC 16–B1 and a platinized-platinum electrode cell having a cell constant of one. The viscosity was determined by measuring the relative drain times of 10.00 ml. quantitives of the sols and water at 25° C. in an Ostwald viscometer. The relative kinematic viscosity, $N_k$, was then computed from the formula $$N_k = \frac{t_s}{t_w}$$

where $t_s$ is the drain time of the sol in seconds and $t_w$ is the drain time of the water in seconds.

Further aspects of this invention will be apparent from the following specific but non-limiting examples.

EXAMPLE 1

A 1500 ml. quantity of uranium dioxide-yttrium oxide-zirconium dioxide sol of oxide composition 43.7% $UO_2$-37.5% $Y_2O_3$-18.8% $ZrO_2$ was prepared by interacting reactive $UO_2$-$ZrO_2$ sol with reactive $Y_2O_3$ sol.

The $UO_2$-$ZrO_2$ sol was obtained by electrodialyzing a uranyl-zirconyl chloride solution with intermittent heating of the system to 80° C. The uranium dioxide and zirconium dioxide were in the 2.32:1 $UO_2$:$ZrO_2$ weight ratio needed for ternary sol. The product binary sol was black, non-settling, and composed of 3–7 millimicron particles. Following electrodialysis, it was treated with Rexyn AG–3 weak anion exchange resin in the hydroxyl form to reduce the residual chloride content to a very low level. After the ion-exchange treatment, the pH of the uranium dioxide-zirconium dioxide sol was 5.1 and its specific conductance was $8.9 \times 10^{-4}$ mho/cm. The total oxide concentration was, by analysis, 6.93 g./100 ml.

The reactive yttrium oxide sol was prepared from yttrium hydroxide precipitated from the corresponding chloride by a 50% excess of aqueous ammonia solution. The precipitate was washed first with a 6 N ammonia solution and with deionized water until the wash water gave a negative test for chloride ion when mixed with silver nitrate. Then the hydrous yttrium oxide was mixed with deionized water to make a slurry, the pH of which was adjusted to 7.2 with acetic acid. A sol was formed when the slurry was heated at 60° C. for two hours. It was, however, a slow-settling sol which required shaking before use.

Electron micrographs showed that the sol particles were about 800 millimicrons in size, irregular in shape, and of low density. The yttrium oxide sol pH was 7.1 and its specific conductance was $4.7 \times 10^{-3}$ mho/cm. On analysis, the oxide concentration was found to be 5.43 g./100 ml.

A mixture of sols was made by adding 544 ml. of the yttrium oxide sol to 699 ml. of the uranium dioxide-zirconium dioxide sol and diluting the mixture with water to a total volume of 1500 ml. Since the specific conductance was already satisfactory, no addition of acetic acid was necessary. The mixture was sealed into a stainless steel pressure vessel, purged with nitrogen gas, and autoclaved for 12 hours at 150° C. with stirring. The pressure vessel was then cooled, and a low viscosity, homogeneous blue-black product sol was recovered.

The solids concentration of the product sol was 5 g./100 ml. The product sol was shown by electron microscopy to consist basically of 3 millimicron particles. Some of these particles were chained while others formed loose aggregates averaging 20 millimicrons in diameter. Changes in the system on autoclaving were as follows:

|  | Before | After |
|---|---|---|
| pH | 7.1 | 7.0 |
| Specific Conductance (mho/cm.) | $3.3 \times 10^{-3}$ | $5.4 \times 10^{-3}$ |

EXAMPLE 2

A uranium dioxide-yttrium oxide-zirconium dioxide sol of oxide composition 45% $UO_2$-35.6% $Y_2O_3$-19.4% $ZrO_2$ was obtained from 699 ml. of the uranium dioxide-zirconium dioxide sol described in Example 1 and 494 ml. of a reactive yttrium oxide sol. The yttrium oxide sol was prepared exactly as the yttrium oxide sol of Example 1 but contained 5.41 g. $Y_2O_3$/100 ml. When the component sols had been mixed and diluted to a final volume of 1500 ml., the specific conductance was found to be only $1.9 \times 10^{-3}$ mho/cm. Therefore 2.8 ml. of concentrated acetic acid was added to the mixture to raise specific conductance to $3.2 \times 10^{-3}$ mho/cm. The system was then sealed into a stainless steel autoclave under nitrogen and heated for 12 hours at 150° C. to effect interaction. The autoclave was stirred continuously during the heating period. At the end of 12 hours, the autoclave was cooled and opened.

The product was a very fluid black sol. Its properties before and after autoclaving are given below:

|  | Before | After |
|---|---|---|
| pH | 7.3 | 6.9 |
| Specific Conductance (mho/cm.) | $3.2 \times 10^{-3}$ | $4.6 \times 10^{-3}$ |

EXAMPLE 3

About 15 liters of the uranium dioxide-yttrium oxide-zirconium dioxide sol obtained by interacting reactive yttrium oxide sol with reactive uranium dioxide-zirconium dioxide sol according to the method described in Examples 1 and 2 were concentrated by vacuum evaporation to 12.5 percent solids. The sol was stirred continuously during the evaporation to avoid bumping. Temperature was maintained at about 40° C. There was no gelation or appreciable increase in viscosity during the concentrating step. Vacuum evaporation was stopped only because the desired concentration level for sols to be incorporated into ceramic matrices had been achieved.

Electron micrographs showed this sol to consist of 3–7 millimicron particles, some being loosely associated into 10–20 millimicron aggregates. The particles, moveover, were homogeneous in composition. An X-ray diffraction pattern of the dispersed phase was also obtained. The sample for X-rays was secured by high-speed centrifugation of a small portion of sol. The diffraction pattern indicated a single-crystalline phase representing a face-centered cubic fluoride structure with cell constant $a_0 = 5.35$ A., indicating the constitutent oxides to be largely in solid solution. A quantitative analysis of the concentrated sol established the actual composition of the dispersed phase as very close to the nominal. The analysis was:

| | Wt. percent |
|---|---|
| $UO_2$ | 43.7 |
| $Y_2O_3$ | 19.0 |
| $ZrO_2$ | 37.3 |

Other sol properties are tabulated below:

| | |
|---|---|
| pH | 6.8 |
| Specific conductance mho/cm | $1.0 \times 10^{-2}$ |
| Density g./cc | 1.09 |
| Relative kinematic viscosity | 2.26 |

EXAMPLE 4

A uranium dioxide-yttrium oxide-zirconium dioxide sol having the composition 45% $UO_2$-35.6% $Y_2O_3$-19.4% $ZrO_2$ was prepared by peptizing the coprecipitated oxides. The starting solution was obtained by mixing soluble chlorides containing the equivalent of 16.9 g. $UO_2$, 13.4 g. $Y_2O_3$, and 7.3 g. $ZrO_2$. The uranous chloride was prepared by electrolytic reduction of uranyl chloride. The yttrium chloride was prepared by dissolving 99.9% yttrium oxide in hydrochloric acid and evaporating nearly to dryness. The zirconyl chloride was obtained commercially.

The mixed chloride solution was diluted to a total volume of 750 ml., then added dropwise to 94.2 ml. of concentrated ammonium hydroxide, a 100% excess above stoichiometric. The flask containing the ammonia was stirred vigorously to insure simultaneous precipitation of all three components. A nitrogen atmosphere was maintained in the flask to prevent uranium oxidation. When addition of the chloride solution had been completed, the coprecipitate was washed with deionized water until free of chloride ions, the nitrogen atmosphere being maintained. Then it was slurried with water to a volume of 750 ml. and mixed with 100 ml. of the strong cation exchange resin Amberlite IR-120 in the hydrogen form. Stirring overnight with the resin peptized the precipitate to a sol.

This sol was blue-black in color, had a low relative viscosity, and settled slowly on standing. It could, however, be redispersed by mild agitation. Its pH was 6.8, and its specific conductance was $1.0 \times 10^{-2}$ mho/cm. The electron micrograph showed that the dispersed phase consisted of irregularly shaped particles ranging in size from 0.01 to one micron. The particles were essentially fragments of densified gel made up of a network of 10 millimicron open-centered squares. Treating the sol hydrothermally at temperatures up to 150° C. did not alter the structure or particle size.

Obviously many modifications and variations of the invention as hereinabove set forth may be made without departing from the essence and scope thereof, and only such limitations should be applied as are indicated in the appended claims.

What is claimed is:

1. A process for preparing a stable uranium dioxide-yttrium oxide-zirconium dioxide aquasol comprising the steps of:
    (a) preparing a mixture of a reactive uranium dioxide-zirconium dioxide aquasol and a reactive yttrium oxide aquasol having a total oxide concentration in the final mixture within the range of from 1 to 100 g./l., a uranium dioxide concentration within the range of from 30 to 99 wt. percent of the total oxide, and an yttrium oxide concentration within the range of from 1 to 99% based on the weight of the yttrium oxide and zirconium dioxide, the sol mixture having a pH within the range of from 6.9 to 7.2,
    (b) autoclaving the mixture at a temperature of from 120 to 200° C. for from 1 to 16 hours under an inert or reducing atmosphere, and
    (c) recovering the product aquasol containing particles of uranium dioxide-yttrium oxide-zirconium dioxide in intimate mixture.

2. The process of claim 1 wherein the sol mixture has a total oxide concentration of from 30 to 80 g./l., a uranium dioxide concentration within the range of from 40 to 50 wt. percent of the total oxide, and an yttrium oxide concentration within the range of from 55 to 75% based on the weight of the yttrium oxide and zironium dioxide.

3. The process of claim 1 wherein the mixture is autoclaved at a temperature of from 140 to 170° C. for from 6 to 10 hours.

4. A process for preparing a stable uranium dioxide-yttrium oxide-zirconium dioxide aquasol comprising the steps of:
    (a) preparing an aqueous solution containing soluble uranous salts, yttrium salts, and zirconyl salts, the proportions of said salts being such that the oxide precipitate thereof has a uranium dioxide concentration within the range of from 30 to 99 wt. percent of the total oxide and an yttrium oxide concentration within the range of from 1 to 99% based on the weight of the yttrium oxide and zirconium dioxide,
    (b) mixing the aqueous solution with a sufficient excess of an aqueous ammonia solution to coprecipitate uranium dioxide-yttrium oxide-zirconium dioxide from said solution,
    (c) separating the coprecipitate from the reaction mixture and washing it with water until substantially free from soluble salts,
    (d) mixing the washed coprecipitate with water and a quantity of a strong cation exchange resin in the hydrogen form sufficient to adjust the mixture pH to from about 6.9 to 7.2 and thereby peptize the coprecipitate, and
    (e) separating the aquasol product containing uranium dioxide-yttrium oxide-zirconium dioxide particles in intimate mixture from the exchange resin.

5. The process of claim 4 wherein the proportions of the uranous, yttrium, and zirconyl salts in the aqueous solution are such that the oxide precipitate thereof has a uranium dioxide concentration within the range of from 40 to 50 wt. percent of the total oxide, and an yttrium oxide concentration of the oxide precipitate thereof within the range of from 55 to 75% based on the weight of the yttrium oxide and zirconium dioxide.

6. An aquasol composition containing intimately associated uranium dioxide-yttrium oxide-zirconium dioxide particles, ranging from 3 to 1000 millimicons in size, the uranium dioxide concentration being within the range of from 30 to 99 wt. percent of the total oxide, the yttrium oxide concentration being within the range of from 1 to 99% based on the wt. of the yttrium oxide and zirconium dioxide, and the aquasol pH being within the range of from 6.9 to 7.2.

References Cited

UNITED STATES PATENTS

| | | | |
|---|---|---|---|
| 3,148,151 | 9/1964 | Fitch et al. | 252—301.1 |
| 3,150,100 | 9/1964 | Fitch et al. | 252—301.1 |

L. DEWAYNE RUTLEDGE, *Primary Examiner.*

S. J. LECHERT, JR., *Assistant Examiner.*